(12) United States Patent
Tomimatu

(10) Patent No.: US 9,062,750 B2
(45) Date of Patent: Jun. 23, 2015

(54) DIFFERENTIAL GEARS WITH A MECHANISM FOR CONTROLLING DIFFERENTIAL MOTION

(71) Applicant: OS GIKEN CO., LTD., Okayama-shi, Okayama (JP)

(72) Inventor: Takuya Tomimatu, Okayama (JP)

(73) Assignee: OS GIKEN CO., LTD., Okayama-shi (JP)

( * ) Notice: Subject to any disclaimer, the term of this patent is extended or adjusted under 35 U.S.C. 154(b) by 120 days.

(21) Appl. No.: 13/912,998

(22) Filed: Jun. 7, 2013

(65) Prior Publication Data
US 2014/0148297 A1    May 29, 2014

(30) Foreign Application Priority Data
Nov. 29, 2012  (JP) ................. 2012-260564

(51) Int. Cl.
*F16H 48/22* (2006.01)
*F16H 48/08* (2006.01)
*F16H 48/20* (2012.01)

(52) U.S. Cl.
CPC ............ *F16H 48/22* (2013.01); *F16H 48/08* (2013.01); *F16H 2048/207* (2013.01)

(58) Field of Classification Search
CPC .... F16H 48/22; F16H 48/08; F16H 2048/207

USPC ........................................................ 475/231
See application file for complete search history.

(56) References Cited

U.S. PATENT DOCUMENTS 6,524,211 B2 *  2/2003  Okazaki .................... 475/241
7,399,249 B2 *  7/2008  Gansloser et al. ......... 475/249

FOREIGN PATENT DOCUMENTS

| JP | 55-27980 B2 | 7/1980 |
| JP | 58-221046 A | 12/1983 |
| JP | 2001-289305 A | 10/2001 |
| JP | 2010-96239 A | 4/2010 |

* cited by examiner

*Primary Examiner* — Sherry Estremsky
(74) *Attorney, Agent, or Firm* — Westerman, Hattori, Daniels & Adrian, LLP

(57) ABSTRACT

A differential device has a clutch which is provided between at least one side gear and a differential case to limit relative rotation of the side gear and the differential case. The clutch includes one or more inner pawl discs and outer pawl discs alternately arranged in an axial direction of the side gear between an inner peripheral surface of the differential case and an outer peripheral surface of the side gear. The side gear includes a gear-side fit part extending in the axial direction to which the inner pawl disc is concave-convex fitted. The differential case includes a case-side fit parts extending in the axial direction to which the outer pawl clutch is concave-convex fitted. At least one of the gear-side fit part and the case-side fit part is formed in a spiral shape angled with respect to the axial direction.

7 Claims, 14 Drawing Sheets

DIFFERENTIAL GEARS WITH A MECHANISM FOR CONTROLLING DIFFERENTIAL MOTION

TECHNICAL FIELD

The present invention relates to differential devices with a limited-slip differential mechanism.

BACKGROUND ART

As differential devices for vehicles, there are widely employed differential devices with a limited-slip differential mechanism configured to, even when one wheel on the vehicle is lifted and run idle, transfer sufficient torque to the other wheel via a clutch means to prevent, situations in which, when the one wheel rises up over ice, snow, or mud, for example, and runs idle, sufficient torque is not transferred to the other wheel to disable the vehicle to be started, or in which the vehicle fishtails during cornering or at sudden starting or the like.

For example, Patent Documents 1 and 2 each disclose a differential device 100 with a limited-slip differential mechanism as shown in FIG. 15. The differential device 100 includes: a pair of pressure rings 103 that is provided in a differential case 101 so as to be capable of movement along axles 102 and incapable of relative rotation; a pinion shaft 101 that is orthogonal to the axles 102 and held at shaft end between the pressure rings 103; a pinion gear 105 that is rotatably provided at the pinion shaft 104; a pair of side gears 106 that are provided at axle ends of the right and left axles 102 so as to be incapable of relative rotation, and that engage with the pinion gear 105 on both sides of the pinion gear 105; an operation means 108 that operates the pressure rings 103 in a direction in which a clearance 107 increases between the pressure rings 103 with increase in relative rotation torque between the pinion shaft 104 and the differential case 101 with a differential; and clutch means 109 that are disposed on both sides of a pair of the pressure rings 103 along the axles and are operated by the pressure rings 103 to limit a differential between the right and left axles 102 with increase in the clearance 107.

The operation means 108 is suggested in various shapes. In the employed operation means 108, for example, square cam parts 110 are formed at shaft ends of the pinion shaft 104 so as to have one diagonal line positioned along the axles, and almost V-shaped cam grooves 111 are formed in the pressure rings 103 to engage the cam parts 110.

In the differential device 100, when relative, rotation torque is generated between the pinion shaft 104 and the differential case 101 and the operation means 108 makes the clearance, 107 increase between the pressure rings 103, the clutch means 109 are activated to limit, a differential between the right and left wheels. To return the clearance 107 in the both pressure rings 103 to the set amount in the normal state, elastic members 112 such as disc springs are disposed on outer sides of the both clutch means 109 along the axles to bias the pressure springs 103 to come closer to each other via a plurality of clutch plates 113 in the clutch means 109.

Since the elastic members 112 in the differential device 100 bias the pressure rings 103 to come closer to each other via the clutch plates 113, when the biasing force of the elastic members 112 is made weak, the clutch means 109 are operated more easily by the operation means 108, and thus the vehicle may enter into a differential-limited state even during low-speed cornering, thereby resulting in an unstable differential state. Meanwhile, when the biasing force of the elastic members 112 is made strong, the operation means 108 enters into a differential state. However, the clutch plates 113 are constantly in friction pressure contact by the biasing force of the elastic members 112 to bring virtually the operation means 108 into a differential-limited state, and eventually it is not possible to provide the stable differential state during low-speed cornering. Accordingly, the vehicle cannot turn in a small radius during low-speed cornering, or the vehicle exhibits a so-called chattering phenomenon in which the differential-limited state and the differential state are switched back and forth to deteriorate maneuverability of the vehicle or exert adverse influence on the differential device 100 and peripheral devices thereof by the impact of chattering.

Accordingly, the applicant has suggested and put into practical use a differential device with a limited-slip differential mechanism configured to switch appropriately between the differential state and the differential-limited state, by providing biasing means to bias the pressure rings to come closer to each other, not through the clutch plates, to omit the elastic members 112 or provide the elastic members 112 with biasing force weakened to such an extent that play of the clutch plates is removed, as disclosed in Patent Document 3.

CITATION LIST

Patent Literatures

Patent Document 1: JP-B No. S55-27980
Patent Document 2: JP-A No. S58-221046
Patent Document 3: JP-A No. 2001-289305

SUMMARY OF INVENTION

Technical Problem

However, in the differential device disclosed in Patent Document 3, when a vehicle is started with one wheel completely lifted from the ground, only the one wheel rotates (runs idle) because there is no trigger for opening the right and left pressure rings, thereby making the vehicle very difficult to start. In addition, in the case of a racing car, when the racing car turns an inside corner in a circuit, the inside wheel rises up over on the shoulder of a road, and bound and run idle. At that time, when the accelerator pedal is released, the right and left pressure rings are closed to switch the differential-limited state to the differential state, and thus the wheel runs idle and loses momentum.

To solve the foregoing problem, the biasing force of the elastic members may be made stronger. In this case, however, the clutch plates are constantly in friction pressure contact by the biasing force of the elastic member and virtually bring the wheels into the differential-limited state, and eventually it is not possible to provide the stable differential state during low-speed cornering, as in the inventions disclosed in Patent Documents 1 and 2. Accordingly, there is the possibility that the vehicle cannot turn in a small radius during low-speed cornering, or the vehicle exhibits a so-called chattering phenomenon in which the differential-limited state and the differential state are switched back and forth to deteriorate maneuverability of the vehicle, or exert adverse influence on the differential device and peripheral devices thereof by the impact of chattering.

An object of the present invention is to provide a differential device with a limited-slip differential mechanism that can be simply configured to appropriately switch between the differential state and the differential-limited state, and allows a vehicle to be started even with one wheel lifted from the ground.

Solution to Problem

A differential device with a limited-slip differential mechanism according to the present invention, includes: a differential case that rotates around right and left axles by a driving force from an engine; a pair of right and left side gears that are provided in the differential case at ends of the right and left axles so as to be incapable of relative rotation; a pinion, shaft that is provided orthogonal to the axles between the pair of right and left side gears and rotates together with the differential case; and at least a pair of pinion gears that are provided rotatably at the pinion shaft and engage with the pair of right and left side gears, wherein a clutch means is provided between at least one of the side gears and the differential case to limit relative rotation of the side gear and the differential case, the clutch means includes one or more inner pawl discs and outer pawl discs that are alternately arranged in the axial direction of the side gear between an inner peripheral surface of the differential case and an outer peripheral surface of the side gear, the side gears include a gear-side fit part extending in the axial direction to which the inner pawl disc is concave-convex fitted, the differential case includes a case-side fit part extending in the axial direction to which the outer pawl disc is concave-convex fitted, and at least one of the gear-side fit part and the case-side fit part is formed in a spiral shape angled with respect to the axial direction.

In the differential device, when the right and left wheels are the same in rotational resistance, the side gears, the pinion shaft, the pinion gears, and the clutch means rotate collectively and integrally with the differential case, and thus the right and left wheels rotate at the same speed. Meanwhile, when the right and left wheels are different in rotational resistance, the pinion gears revolve while engaging with the side gears by part of a rotating force acting on the differential case, and the wheel enter into the differential state in which the rotation speed of the wheel with a smaller rotational resistance is higher than the rotation speed of the wheel with larger rotational resistance. In addition, in the differential state, the rotation speed of the wheel with a smaller rotational resistance is higher than the rotation speed of the differential case, and the rotation speed of the wheel with a larger rotational resistance is lower than the rotation speed of the differential case. Accordingly, there are generated differences in rotation speed between the right and left side gears and the differential case, and the inner pawl disc and the outer pawl disc in the clutch means relatively rotate while being in sliding contact with each other. In addition, when the contact pressure between the inner pawl discs and the outer pawl discs is small, the inner pawl disc and the outer pawl disc almost freely rotate relative to each other, whereas when the contact pressure between the inner pawl disc and the outer pawl disc is large, part of rotation torque on the wheel with a smaller rotational resistance is distributed to the wheel with a larger rotational resistance, whereby the wheels enter into the differential-limited state in which the differential between the right and left wheels is limited. Specifically, when there are small differences in rotation speed between the side gears and the differential case, the contact pressure between the inner pawl disc and the outer pawl disc is small, the inner pawl disc and the outer pawl disc almost freely rotate relative to each other. Meanwhile, when there are larger differences in rotation speed between the side gears and the differential case, the inner pawl disc and/or the outer pawl disc move, along the spiral-shaped gear-side fit part and/or the case-side fit part in the axial direction, the contact pressure between the inner pawl disc and the outer pawl disc becomes larger, and the distributed rotation torque becomes larger, whereby the wheels enter into the differential-limited state in which the differential between the right and left wheels is limited.

For example, when the gear-side fit part of the side gear is formed in a spiral shape, the inner pawl disc in the clutch means more in the axial direction along the spiral-shaped gear-side fit part according to the differences in rotation speed between the side gears and the differential case, the contact pressure between the inner pawl disc and the outer pawl disc becomes larger, and the distributed rotation torque becomes larger, whereby the wheels enter into the differential-limited state in which the differential between the right and left wheels is limited.

When the case-side fit parts of the differential case are formed in a, spiral shape, the outer pawl disc in the clutch means more in the axial direction along the spiral-shaped case-side fit part according to the differences in rotation speed between the side gears and the differential case, the contact pressure between the inner pawl disc and the outer pawl disc becomes larger, and the distributed rotation torque becomes larger, whereby the wheels enter into the differential-limited state in which the differential between the right and left wheels is limited.

When the gear-side fit part and the case-side fit part are formed in a spiral shape, the wheels enter into the differential-limited state in which the differential between the right and left wheels is limited, by a synergistic effect of the both foregoing cases.

As in the foregoing, in the differential device with a limited-slip differential mechanism basically as in conventional differential devices with a limited-slip differential mechanism, when the right and left wheels are the same in rotational resistance, the right and left wheels rotate at the same speed, whereas when the right and left, wheels are different in rotational resistance, the wheels enter into the differential state in which the rotation speed of the wheel with a smaller rotational resistance is higher than the rotation speed of the wheel with a larger rotational resistance. Meanwhile, when there are larger differences in rotation speed between the right, and left wheels, the contact pressure between the inner pawl disc and the outer pawl disc becomes larger accordingly, and part of the rotation torque on the wheel with a smaller rotational resistance is distributed to the wheel with a larger rotational resistance, whereby the wheels enter into the differential-limited state in which the differential between the right and left wheels is limited.

In the differential device, unlike conventional differential devices using pressure rings and cams, the differential-limited state can be obtained by a simple configuration in which at least one of the gear-side fit part and the cast-side fit part is formed in a spiral shape angled with respect to the axial direction. This makes it possible to omit the pressure rings and reduce parts count of the differential device. In addition, the differential device is also configured to obtain the differential-limited state by moving the disc along the spiral-shaped fit part due to differences in rotation speed between the side gears and the differential case, which makes it possible to, even when one wheel is lifted from the ground, reliably transfer a rotation torque to the other wheel on the ground. Accordingly, in situations in which an automobile is started with one wheel completely lifted or a racing car bounds with one wheel rising up on the shoulder of a road in a circuit during cornering, the wheels are brought into the differential-limited state and it is possible to supply sufficient rotation torque to the wheel on the ground, thereby significantly improving driving stability of the vehicle during cornering.

In the foregoing configuration, it is preferred to set a spiral angle with respect to the axial direction within the range of 20 to 60°. When the spiral angle is less than 20°, switch from the differential state to the differential-limited state does not take place with favorable responsiveness, and when the spiral angle exceeds 60°, the concave-convex fit portion between the inner pawl disc and the gear-side fit part and the concave-convex fit portion between the outer pawl disc and the case-side fit part bite into each other, and thus switch from the differential-limited state to the differential state does not take place in a smooth manner. Accordingly, the spiral angle is set at 20 to 60°, preferably 30 to 50°, more preferably 35 to 45°.

It is preferred to provide clutch means between the right side gear and the differential case and between the left side gear and the differential case to limit relative rotation of the side gears and the differential case. The clutch means may be provided only between one side gear and the differential case. However, it is preferred to provide the clutch means between the right and left side gears and the differential case because it is possible to effectively utilize dead space on outer peripheral sides of the side gears to increase the number of the discs as much as possible.

It is preferred to form the gear-side fit part in a spiral shape, and set the gear-side fit parts in the pair of side gears so as to be reversed to each other in the direction of spiral in the assembled state. This makes it possible to use the right and left side gears in the same configuration and preferably reduce manufacturing costs for the side gears.

The gear-side fit parts in the pair of side gears may be made different from each other in the spiral angle with respect to the axial direction. For vehicles for running on general roads, the gear-side fit parts are preferably set identical in the spiral angle. Meanwhile, for racing cars running around circuits, the gear-side fit parts preferably have the spiral angle adapted to circuit courses.

It is preferred to provide a pair aright and left pressure rings movable along the axles and rotating together with the differential case in the differential case so as to cover outer peripheral sides of the right and left side gears, provide biasing, means to bias the both pressure rings in a direction in which a clearance between the both pressure rings decreases, provide the pinion shaft so as to be held at shaft ends thereof between the right and left pressure rings, and provide operation means between the shaft ends of the pinion shaft and the right and left pressure rings to operate the pressure rings against the biasing force of the biasing means in a direction in which the clearance between the both pressure rings increases according to increase in relative rotation torque between the pinion shaft and the differential case in the differential state, thereby activating the clutch means. In this case, it is possible to obtain the differential state and the differential-limited state in a more stable manner by combining the limited-slip differential mechanism in the present invention in which at least one of the gear-side fit part and the case-side fit part is formed in a spiral shape with a conventional differential-limited mechanism having pressure rings, biasing means, and operation means (hereinafter, referred to as a cam-type limited-slip differential mechanism). Specifically, in the cam-type limited-slip differential mechanism, the operation means exerts an operation force on the pressure rings in a direction in which the clearance between the pressure rings increases according to the relative rotation torque between the pinion shaft and the differential case. When the operation force of the operation means is smaller than the biasing force of the biasing means to decrease the clearance, the clearance is not Changed and the normal differential state is obtained. When the operation force is larger than the biasing force, the clearance between the pressure rings increases accordingly, the inner pawl disc and the outer pawl disc in the clutch means are brought into friction pressure contact, whereby a differential between the right and left axles is limited. In the earn-type limited-slip differential mechanism, when one wheel is lifted completely, the differential-limited state may be more difficult to obtain. Meanwhile, in the differential device of the present invention using the spiral-shaped gear-side fit part and case-side fit part, when differences in rotation speed is generated between the differential case and the side gears, the differential-limited state can be swiftly obtained. Accordingly, combining the two differential devices makes it possible to obtain the differential-limited state at a more preferred timing.

The differential device having a cam-type limited-slip differential mechanism may be configured in such a manner that clutch means is provided only between one side gear and the differential case to limit relative rotation of the side gear and the differential case; one pressure ring movable along the axles and rotating together with the differential case is provided, in the differential case so as to cover the outer peripheral side of the one side gear; the pinion shaft is provided so as to be held at a shaft end thereof between the pressure ring and a wall portion of the differential case opposed to the pressure ring; and operation means is provided between the shaft end of the pinion shaft and the pressure ring and the wall portion of the differential case holding the shaft end to operate the pressure ring against the biasing force of the biasing means in a direction in which the clearance between the pressure ring and the differential case increases according to increase in relative rotation torque between the pinion shaft and the differential case in the differential state, thereby activating the clutch means, in the cam-type limited-slip differential mechanism in the differential device, the operation means exerts an operation force on the pressure ring in a direction in which the clearance between the pressure ring and the wall portion of the differential case increases according to the relative rotation torque between the pinion shaft and the differential case. When the operation force of the operation means is smaller than the biasing force of the biasing means to decrease the clearance, the clearance is not changed and the normal differential state is obtained. When the operation force is larger than the biasing three, the clearance between the pressure ring and the wall portion of the differential case increases accordingly, the inner pawl disc and the outer pawl disc in the clutch means are brought into friction pressure contact, whereby a differential between the right and left axles is limited.

It is preferred to provide biasing means to bias the pressure ring in a direction in which the clearance decreases not through the clutch means. In this case, even when the biasing force of the biasing means is made stronger, the discs in the clutch means are brought into contact under strong friction pressure. Accordingly, the timing for switching by the operation means from the differential state to the differential-limited state depends only on the operation force of the operation means and the biasing force of the biasing means. This makes it possible to perform the switching at a proper timing by setting properly the biasing force of the biasing means.

Advantageous Effects of Invention

According to the differential device with a limited-slip differential mechanism in the present invention, basically as in conventional differential devices with a limited-slip differential mechanism, when the right and left wheels are the same in rotational resistance, the right and left wheels rotate at the same speed, whereas when the right and left wheels are different in rotational resistance, the wheels enter into the differential state in which the rotation speed of the wheel with a smaller rotational resistance is higher than the rotation speed of the wheel with a larger rotational resistance. Meanwhile, when there are larger differences in rotation speed between the right and left wheels the contact pressure between the inner pawl disc and the outer pawl disc becomes larger accordingly, and part of the rotation torque on the wheel with as smaller rotational resistance is distributed to the wheel with a larger rotational resistance, whereby the wheels enter into the differential-limited state in which the differential between the right and left wheels is limited.

In the differential device, unlike conventional differential devices using pressure rings and cams, the differential-limited state can be obtained by a simple configuration in which at least one of the gear-side fit part and the case-side fit part is formed in a spiral shape angled with respect to the axial direction. This makes it possible to omit the pressure rings and reduce parts count of the differential device. In addition, the differential device is also configured to obtain the differential-limited state by moving the disc along the spiral-shaped fit part due to differences in rotation speed between the side gears and the differential case, which makes it possible to, even when one wheel is lifted from the ground, reliably transfer a rotation torque to the other wheel on the ground. Accordingly, in situations in which an automobile is started with one wheel completely lifted or a racing car bounds with one wheel rising up on the shoulder of a road in a circuit, during cornering, the wheels are brought into the differential-limited state and it is possible to supply sufficient, rotation torque to the wheel on the ground, thereby significantly improving driving stability of the vehicle during cornering.

BRIEF DESCRIPTION OF THE DRAWINGS

FIG. 7A illustrates a condition where the pinion shaft rotates slightly relative to the pressure rings, and FIG. 7B illustrates a subsequent condition where the pressure rings move in directions away from each other via the operation surfaces and the inclined cam surfaces;

DESCRIPTION OF EMBODIMENTS

An embodiment of the present invention will be described below with reference to the drawings.

Figure 1:
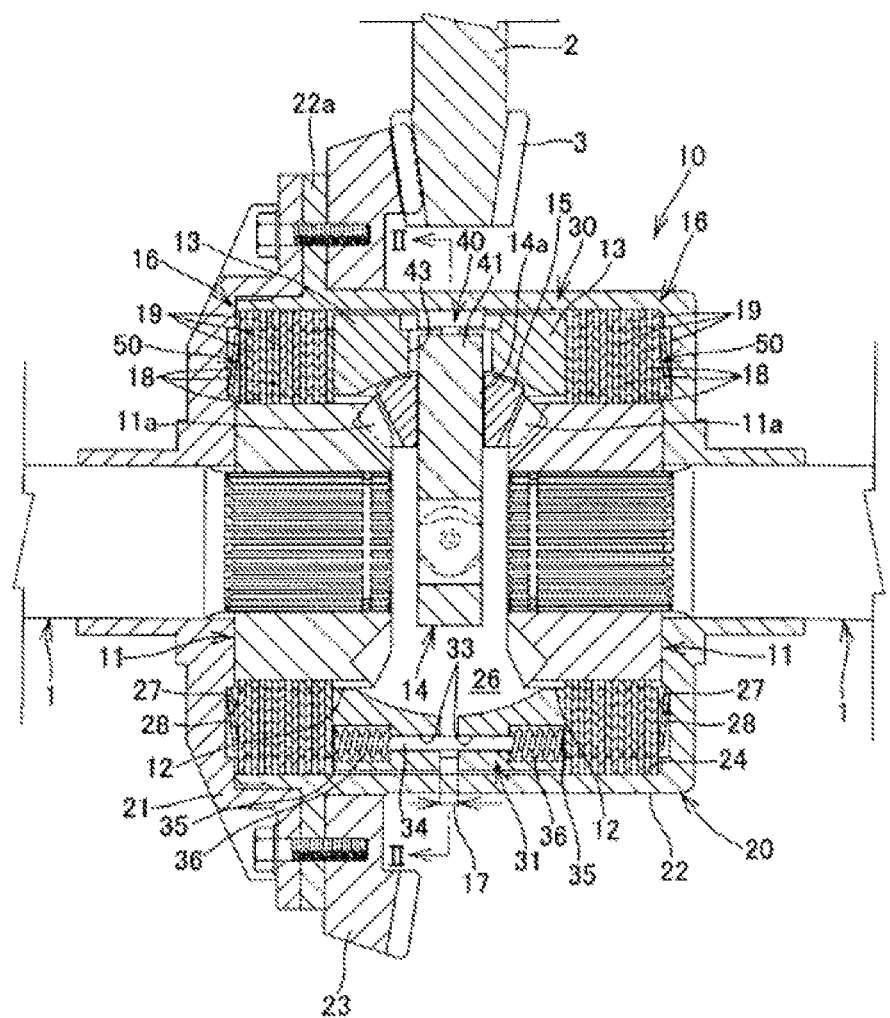
FIG. 1 is a transverse cross-section view of a differential device (cross-section view of FIG. 2 taken along line I-I)
Figure 2:
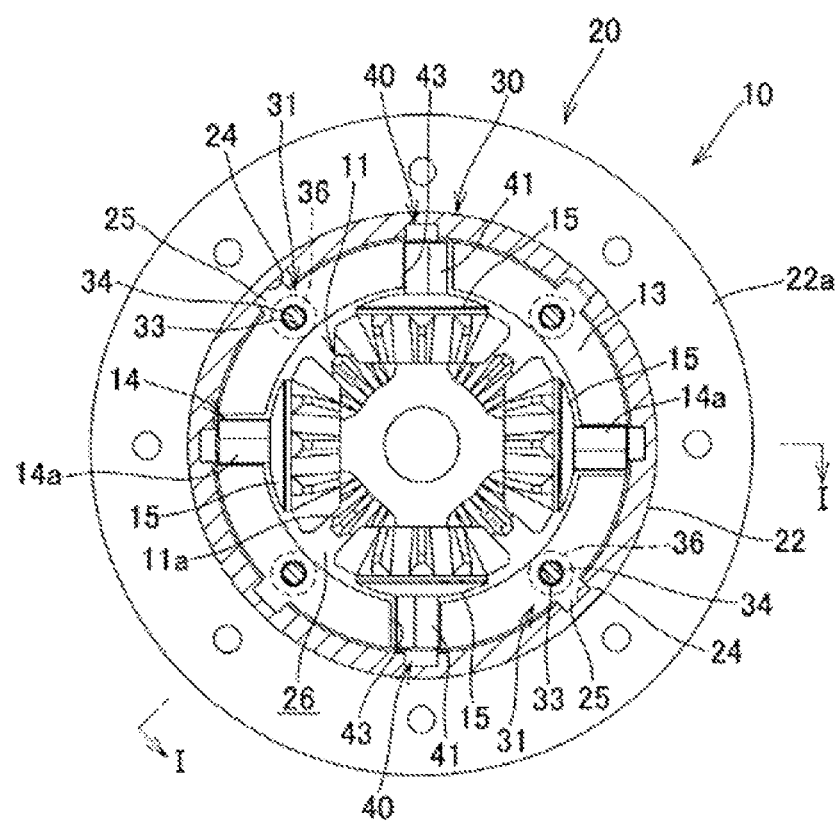
FIG. 2 is a cross-section view of FIG. 1 taken along line II-II.

As shown in FIGS. 1 and 2, a differential device 10 is a differential device for FR vehicles, including: a differential case 20 that rotates around the right and left axles 1 by a driving force from an engine; a pair of right and left side gears 11 that are provided in the differential case 20 at axle ends of the right, and left axles 1 so as to be incapable, of relative rotation; a pair of right and left pressure rings 13 capable of moving along the axles 1 and incapable of relative rotation that are attached in the differential case 20 so as to cover outer peripheral sides of the right and left gears 11; a pinion shaft 14 that is provided orthogonal to the axles 1 so as to be held at shaft ends between the right and left pressure rings 13; at least one pair of pinion gears 15 that are rotatably provided at the pinion shaft 14 so as to engage gear parts 11a of the right and left side gears 11; clutch means 16 that are provided between the right and left side gears 11 and the differential case 20; a cam-type limited-slip differential mechanism 30 that operates the pressure rings 13 in a direction in which a clearance 17 between the pressure rings 13 increases to limit a differential between the differential case 20 and the both side gears 11; and a spiral-type limited-slip differential mechanism 50 that mores inner pawl discs 18 in the clutch means 10 along spiral-shaped gear-side fit parts 12 at the right and left side gears 11 to limit a differential between the differential case 20 and the both side gears 11.

The differential case 20 is split, into a lid member 21 and a case main body 22, and the lid member 21 is fixed to a flange part 22a formed at a left end portion of the case main body 22. A ring gear 23 is fixed to the flange part 22a on the opposite side of the lid member 21, and the ring gear 23 engages a drive pinion 3 provided at a drive shaft 2 extending from the engine. In addition, the axle ends of the right and left axles 1 are concentrically inserted into the differential case 20 through right walls of the lid member 21 and the case main body 22. The differential case 20 is configured to rotate around the axles 1 by a driving force from the engine through the drive pinion 3 and the ring gears 23.

Case-side it parts 24 including a plurality of streak grooves extending along the axles are formed at circumferential intervals therebetween on an inner peripheral surface of the case main body 22 along the entire length, and one pair of right and left pressure rings is provided in the case main body 22 so as to be opposed to each other at partially spherical inner surface sides thereof. Protruding streaks 25 are formed on outer peripheral surfaces of the both pressure rings 13 so as to concave-convex fit into the case-side fit parts 24 of the case main body 22. The both pressure rings 13 are provided in the case main body 22 so as to be capable of moving along the axles and incapable of relative rotation by the concave-convex fit of the protruding streaks 25 and the case-side fit parts 24. The size and shape of the differential case 20 can be set arbitrarily according to the vehicle to which the differential device is applied. In addition, the case-side fit part 24 and the protruding streaks 25 can be formed in any cross section shape as far as the case-side fit parts 24 and the protruding streaks 25 are configured to guide the pressure rings 13 so as to be capable of moving along the axles 1 and incapable of relative rotation with respect to the differential case 20. In the illustrated differential device 10, the eight each case-side fit parts 24 and protruding streaks 25 are provided, but the numbers of the case-side fit parts 24 and the protruding streaks 25 can be set arbitrarily.

The almost cross-shaped pinion shaft 14 is provided in a gear chamber 26 formed between the both pressure rings 13. The pinion shaft 14 has four shaft parts 14a extending orthogonally to the axles 1, and the pinion gears 15 are rotatably supported at the shaft parts 14a. The number of the pinion gears 15 can be set arbitrarily, but at least one pair of the pinion gears 15 is to be provided.

Figure 3:
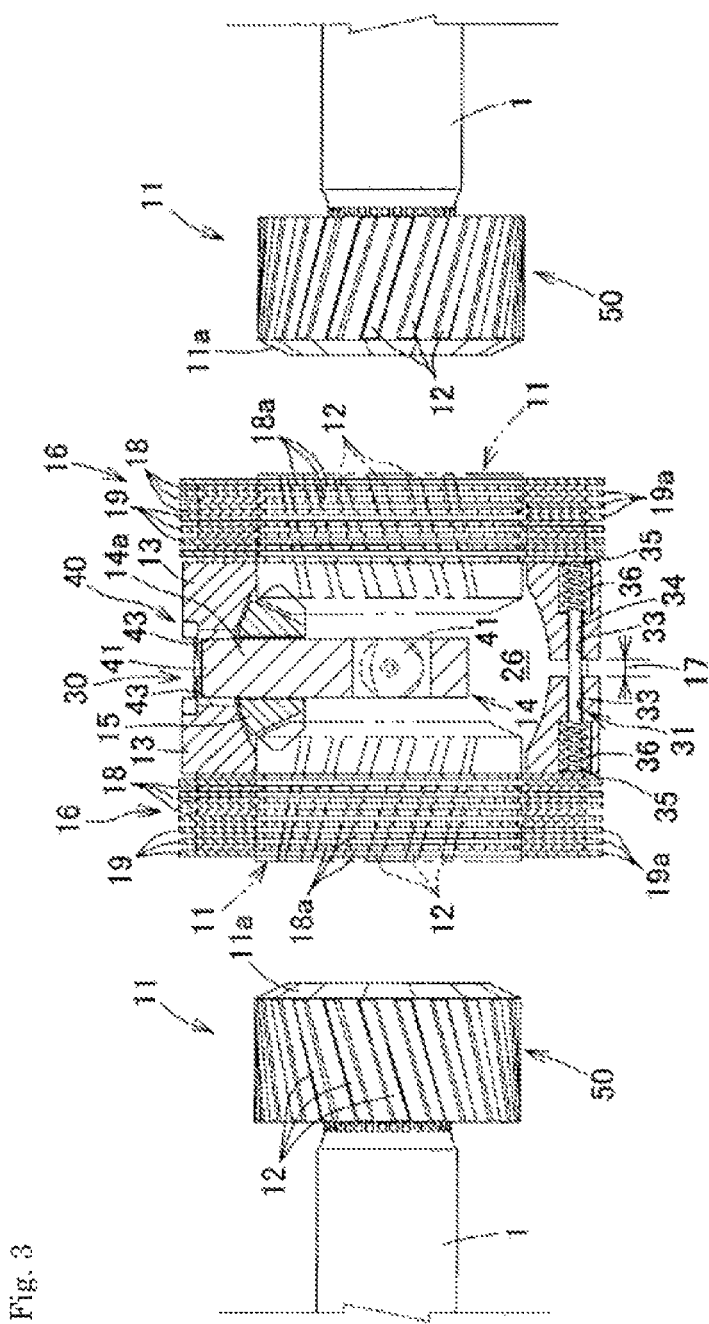
FIG. 3 is an illustration diagram showing a fit state of inner pawl discs and outer pawl discs and side gears.
Figure 4:
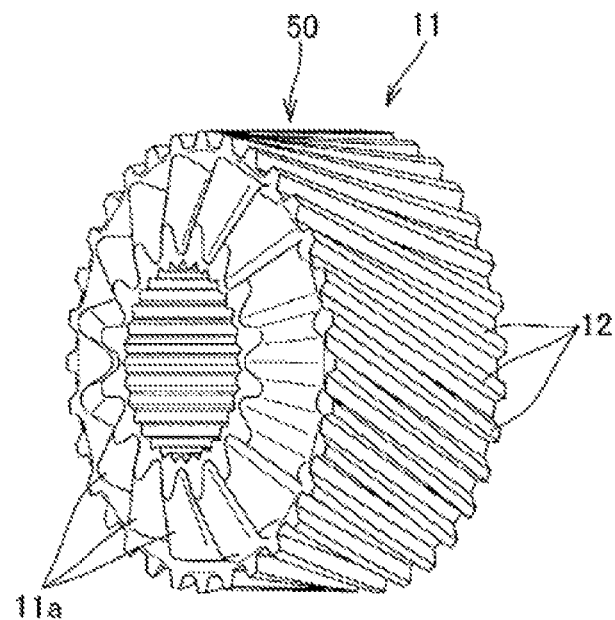
FIG. 4 is a perspective view of the side gear.
Figure 5:
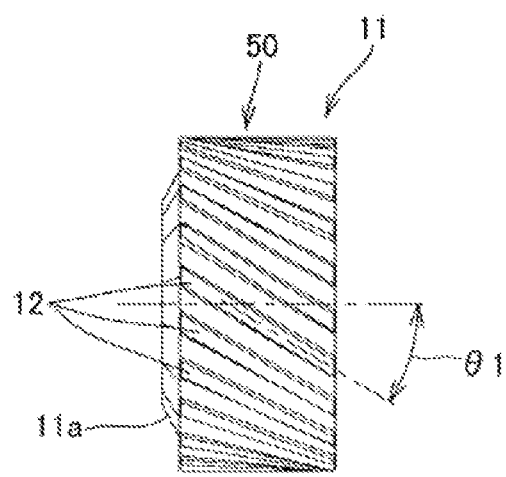
FIG. 5 is a perspective view of the side gear.
Figure 6A:
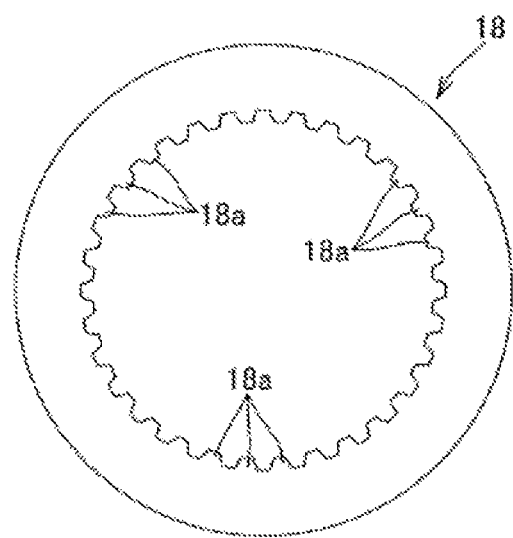
FIG. 6A is a front view of the inner pawl disc and FIG. 6B is a front view of the outer pawl disc.
Figure 6B:
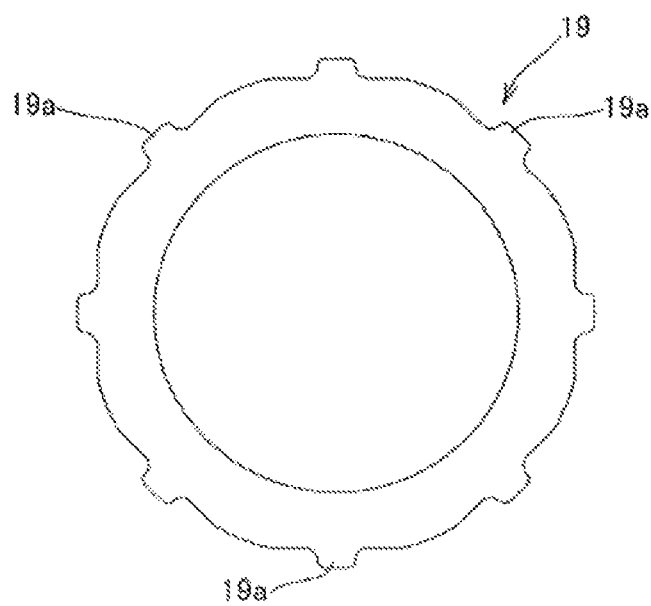

As shown in FIGS. 2, 3, and 7, the pinion shaft 14 has cam parts 41 at shaft ends thereof, the both pressure rings 13 have cam grooves 43 corresponding to the cam parts 41 at opposed portions of peripheral walls thereof, and the pinion shaft 14 is supported in the gear chamber 26 by sandwiching the cam parts 41 at the shaft parts 14a between the cam grooves 43 in the both pressure rings 13. The cam parts 41 and the cam grooves 43 constitute an operation means 40, which will be described later in detail.

As shown in FIGS. 1 to 5, one pair of right and left side gears 11 is provided on the inner sides of the right and left pressure rings 13 on both sides of the pinion gears 15, and the gear parts 11a of the right and left side gears 11 are engaged with the pinion gears 15. The axle end of the left-side axle 1 is fitted into the left side gear 11 by a fitting structure such as spline fitting, and is coupled to the left side gear 11 so as to be incapable of relative rotation. The axle end of the right-side axle 1 is fitted into the right side gear 11 by a fitting structure such as spline fitting, and is coupled to the right side gear 11 so as to be incapable of relative rotation. The side gears 11 have, a length along the axles. The side gears 11 have, at the outer peripheral part thereof, gear-side fit parts 12 as protruding streaks extending in a spiral form at an angle θI with respect to the axial direction. The gear-side fit parts 12 protrude along almost the entire length of the side gears 11 at circumferential intervals therebetween. The cross section shape and number of the gear-side fit parts 12 can be set arbitrarily.

The both side gears 11 are protruded toward the right, and left sides of the both pressure rings 13. The clutch, means 16 are attached onto the side gears 11 on the both sides of the pressure rings 13 along the axles. The right and left clutch means 16 have the inner pawl discs 18 and the outer pawl discs 19 alternately arranged. The outer pawl discs 19 have, at outer peripheral parts thereof, outer pawl parts 19a concave-convex fitted to the case-side fit parts 24 of the differential case 20 at circumferential intervals therebetween. The outer pawl discs 19 are fitted into the differential case 20 so as to be capable of moving along the axles and incapable of relative rotation by the concave-convex fit between the outer pawl parts 19a and the case-side fit parts 24. The inner pawl discs 18 have, at inner peripheral parts thereof, inner pawl parts 18a concave-convex fitted to the gear-side fit parts 12. The inner pawl discs 18 are fitted onto the side gears 11 so as to move in the axial direction of the side gears 11 while rotating relative to the side gears 11 by the concave-convex it between the inner pawl parts 18a and the spiral-shaped gear-side fit parts 12. When the discs 18 and 19 are brought into pressure contact with each other by the movement of the inner pawl discs 18 in the axial direction, the differential case 20 and the side gears 11 are limited in relative rotation according to a friction force generated between the discs 18 and 19. The numbers of the discs 18 and 19 in the right and left clutch means 16 may be identical or different. Although the numbers of the discs 18 and 19 can be set arbitrarily, too small numbers of the discs 18 and 19 cannot perform the differential limiting function sufficiently, and thus it is preferred to provide the highest numbers of the discs 18 and 19 as fax as the size of the differential case 20 permits. In addition, the outer diameters of the discs in the right, and left clutch means 16 are preferably identical but may be different. Further, the clutch means 16 are preferably provided on both right and left sides, but one of the clutch means 16 may be omitted if there is no placement space.

Groove parts 27 are formed on right walls of the lid member 21 and the case main body 22. Disc springs 28 are provided in the groove parts 27 on the outsides of the both clutch means 16 to bias the discs 18 and 19 toward the pressure ring 13 sides. The disc springs 28 are intended to eliminate play between the discs 18 and 19 and have a biasing force to an extent that little friction force acts between the discs 18 and 19. However, the disc springs 28 may be omitted if the clutch means 16 can be assembled almost without play, in this embodiment, the disc springs 28 are stored in the groove parts 27 to increase the numbers of the discs 18 and 19 as much as possible, but the groove parts 27 may be omitted.

The cam-type limited-slip differential mechanism 30 includes: biasing means 31 that bias the both pressure rings 13 in a direction in which the clearance 17 between the both pressure rings 13 decreases; and the operation means 40 that operate the pressure rings 13 against the biasing force of the biasing means 31 in a direction in which the clearance 17 between the both pressure rings 13 increases according to increase, of relative rotation torque between the pinion shaft 14 and the differential case 20 in the differential state, thereby activating the clutch means 16.

The biasing means 31 are provided between the both pressure rings 13 to bias the pressure rings 13 so as to come closer to each other. Specifically, the pressure rings 13 have through holes 33 between the shaft ends of the adjacent shaft parts 14a of the pinion shaft 14, and rod members 34 extending across the both pressure rings 13 are inserted into the through holes 33. The length of the rod members 34 is set so as not to protrude out of the pressure rings 13 even when the both pressure rings 13 come closest, to each other, that is, the clearance 17 between the both pressure rings 13 becomes smallest. The rod members 34 have flange parts 35 at end portion thereof. Elastic members 36 as compression coil springs are attached onto right and left portions of the rod members 34. The both pressure rings 13 are constantly biased by biasing force of the elastic members 36 in a direction in which the pressure rings come closer to each other via, the rod members 34.

An arbitrary number of biasing means 31 can be provided at arbitrary positions in an arbitrarily configuration as far as the biasing means 31 can bias the both pressure rings 13 in a direction in which the pressure rings 13 come closer to each other not through the clutch means 16. For example, instead of the rod members 34, rod members having a screw portion at one end thereof may be used such that the one each end of the rod members are threadably fitted into one of the pressure rings 13. In this case, the biasing means 31 can be preferably assembled in an easier manner. Besides, in this case, the rod members 34 can be provided such that the adjacent rod members have the screw portions reversely arranged. In addition, instead of the elastic members 36 as compression coil springs, elastic members as disc springs, synthetic rubber, or the like may be used, or tension springs or the like may be used to pull the both pressure rings 13 in a direction in which the pressure rings 13 come closer to each other. Further, the biasing means 31 may be provided between the differential case 20 and the pressure rings 13.

As described above, when the biasing means 31 are provided between the adjacent shaft ends of the pinion shaft 14 in the pressure rings 13, the biasing means 31 can be situated in dead space between the shaft ends. Accordingly, the pressure rings 13 and the differential case 20 can be made smaller in the radial direction, and the shaft ends of the pinion shaft 14 can be extended up to near the inner surface of the differential case 20 to increase contact areas between the earn parts 41 and the cam grooves 43 of the operation means 40 as described below. This makes it possible to effectively prevent the cam parts 41 and the cam grooves 43 from being worn or damaged due to relative rotation torque between these members, thereby improving the differential device 10 in durability. The rod members 34 in the biasing means 31 may be positioned on the outsides of the shaft ends of the pinion shaft 14 in the pressure rings 13. Although it is preferred to provide the biasing means 31, the present invention can also be applied to the differential device 10 in which the biasing means 31 is omitted and the disc springs 28 bias the right and left pressure rings 13 in which the two come closer to each other.

The operation means 40 are formed by the cam parts 41 at the shaft ends of the four shaft parts 14a of the pinion shaft 14, and the cam grooves 43 in opposed portions of the both pressure rings 13, as shown in FIGS. 3 and 7. The cam parts 41 each include one pair of operation surfaces 44 formed in an almost reversed V shape in mirror symmetry with respect to the axle orthogonal surface of the shaft part 14a including the center, and an abutment surface 45 extending almost along axle 1 on the opposite side of the operation surfaces 44 with the center of the shaft part 14a therebetween. The cam grooves 43 are each formed in an almost right triangle including an inclined cam surface 46 adapted to the operation surface 44 and a lock surface 42 adapted to the abutment surface 45.

Figure 7A:
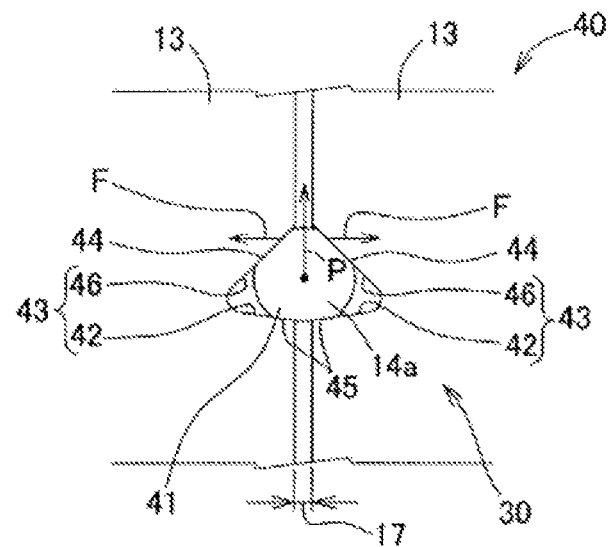
FIGS. 7A and 7B are diagrams showing activation of an operation means, where
Figure 7B:
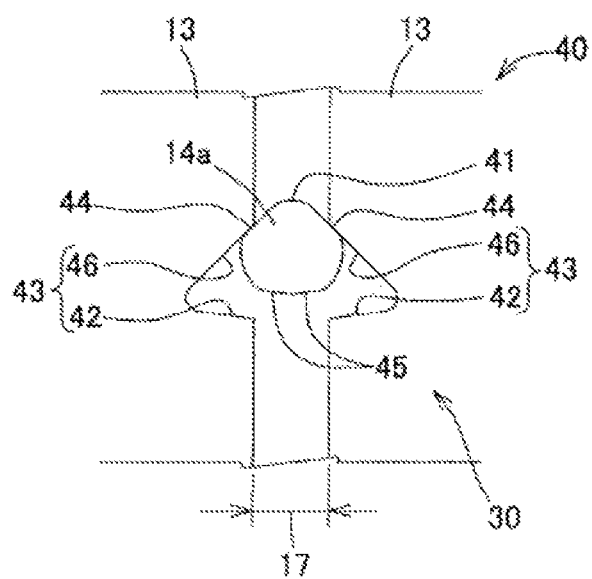

When the pinion shaft 14 in the state shown in FIG. 7A rotates slightly relative to the pressure rings 13 in the upward direction shown in FIG. 7A, the pressure rings 13 move in directions away from each other via the operation surfaces 44 and the inclined cam surfaces 46 as shown in FIG. 7B. Meanwhile, when an attempt is made to cause the pinion shaft 14 in the state shown in FIG. 7A to rotate slightly relative to the pressure rings 13 in the downward direction shown in FIG. 7A, the abutment surface 45 is locked on the lock surfaces 42 to limit relative rotation of the pressure rings 13 and the pinion shaft 14. The operation means 40 may be configured in an arbitrary manner as far as the operation means 40 can be operated in a direction in which the pressure rings 13 separate from each other by the relative rotation torque between the pinion shaft 14 and the differential case 20. For example, as exemplified above in Background Art, the cam parts 41 may be formed in almost a square shape or almost a rhomboid shape with one diagonal line positioned almost along axle 1, and the cam grooves 43 may be formed in an almost V shape adapted to the cam parts.

The spiral-type limited-slip differential mechanism 50 includes the spiral-shaped gear-side fit parts 12 in the side gears 11 and the inner pawl discs 18 having inner pawl parts 18a concave-convex fitted to the gear-side fit, parts 12. Since, the gear-side fit parts 12 are formed in a spiral shape at the angle $\theta 1$ with respect to the axle 1 direction, when the side gears 11 and the inner pawl discs 18 concave-convex fitted to the side gears 11 rotate relatively, the inner pawl discs 18 move in the axial direction of the side gears 11, and the discs 18 and 19 in the right and left clutch means 16 are brought into pressure contact, thereby obtaining the differential-limited state.

The gear-side fit parts 12 of the right and left, side gears 11 are reversed to each other in the direction of spiral in the assembled state. The right and left side gears 11 are the same in configuration to reduce manufacturing costs for the side gears 11. The gear-side fit parts 12 of the right and left side gears 11 may be identical in the direction of spiral in the assembled state. When the gear-side fit pads 12 are reversed in the direction of spiral, the inner pawl discs 18 move in the opposite direction of the side gears 11 even if the side gears, 11 and the inner pawl discs 18 rotate relatively in the same direction. In either case in which the inner pawl discs 18 move toward the disc springs 28 or the pressure rings 13, the inner pawl discs 18 and the outer pawl discs 19 are eventually brought into pressure contact. In addition, the both dins are brought into pressure contact by pressure-contact for according to the relative rotation torque between the side gears 11 and the differential case 20, and part of the rotation torque acting on the differential case 20 is distributed to the wheel with a larger rotational resistance according to the contact pressure between the inner pawl discs 18 and the outer pawl discs 19. Accordingly, even when one wheel is completely lifted, engine power can be transferred to the other wheel to start the vehicle.

The spiral angle $\theta 1$ in the gear-side fit parts 12 with respect to the axial direction is set within the range of 20 to 60°, preferably 30 to 50°, more preferably 35 to 45°. When the spiral angle is smaller than 20°, switch from the differential state to the differential-limited state does not take place in a responsive manner. When the spiral angle exceeds 60°, the concave-convex fit parts between the inner pawl discs 18 and the gear-side fit parts 12 bite each other, or the concave-convex fit parts between the outer pawl discs 19 and the case-side fit parts 24 bite each other to inhibit, smooth switch from the differential-limited state to the differential state. Thus, the spiral angle is preferably set at 20 to 60°.

In the right and left side gears 11, the gear-side fit parts 12 are preferably identical in the spiral angle $\theta 1$ with respect to the axial direction, but may be different from each other. Specifically it is preferred that, for automobiles intended for running on general roads, the gear-side fit parts 12 of the right and left side gears 11 are in the same spiral angle $\theta 1$, whereas it is preferred that, for racing cars running around circuits, the gear-side fit parts 12 of the right and left side gears 11 preferably have the spiral angle $\theta 1$ adapted to circuit courses.

Next, operations of the differential device 10 will be described.

In the differential device 10, when the right and left wheels are the same in rotational resistance, the side gears 11, the pinion gears 15, the pinion shaft 14, the pressure rings 13, and the clutch means 16 rotate collectively and integrally with the differential case 20 to rotate the right and left wheels at the same speed.

When the rotational resistance in one wheel becomes smaller during forward running of the vehicle, the pinion gears 15 revolve while engaging with the gear parts 11a of the side gears 11 by part of rotational force acting on the differential case 20, whereby the wheels are brought into the differential state in which the rotation speed of the wheel with a smaller rotational resistance is higher than the rotation speed of the wheel with a larger rotational resistance. Meanwhile, during high-speed and high load running, the cam-type limited-slip differential mechanism 30 limits the relative rotation of the side gears 11 and the differential case 20 by a friction pressure contact force of the discs 18 and 19 in the clutch means 16, whereby it is possible to provide sufficient handling performance of the vehicle during high-speed and high load running while improving turning performance of the vehicle during low-speed running. In addition, in the differential state, the rotation speed of the wheel with a smaller rotational resistance is higher than the differential case 20, and the rotation speed of the wheel with a larger rotational resistance is lower than the differential case 20, thereby to generate differences in rotation speed between the right and left side gears 11 and the differential case 20. In the clutch means 16, the inner pawl discs 18 and the outer pawl discs 19 relatively rotate while being in sliding contact with each other. When the differences in rotation speed between the right and left wheels becomes equal to or more than a specific value, the spiral-type limited-slip differential mechanism 50 brings the inner pawl discs 18 and the outer pawl discs 19 into pressure contact to limit the relative rotation of the right and left side gears 11 and the differential case 20. This makes it possible to allow the vehicle to be started with one wheel lifted, or provide the racing car with driving stability when the racing car bounds with one wheel rising up on the shoulder of a road in a circuit.

More specifically, when there is a difference in rotational resistance between the right and left wheels during forward running, in the cam-type limited-slip differential mechanism 30, as shown in FIG. 7A, the operation means 40 generate a relative rotation torque P between the pinion shaft 14 and the different case 20, and the relative rotation torque P allows an operation force F to act on the both pressure rings 12 in directions in which the pressure rings 13 separate from each other, via the operation surfaces 44 of the cam parts 41 and the inclined cam surfaces 46 of the cam grooves 43. Then, as shown in FIG. 7B, when the pinion shaft 14 and the differential case 20 attempt to rotate slightly relative to each other, the positions of contacts between the operation surfaces 44 of the cam parts 41 and the inclined cam surfaces 46 of the cam grooves 43 shift from each other to increase the clearance 17.

Meanwhile, the both pressure rings 13 are constantly subjected to the biasing force of the biasing means 31 to make the pressure rings 13 come closer to each other. Accordingly, when the operation force F of the operation means 40 is smaller than the biasing force of the biasing means 31, the smallest clearance 17 is maintained to obtain the differential state, as shown in FIG. 7A. When the operation force F is larger than the biasing force, the clearance 17 increases according to the difference between the forces, and the discs 18 and 19 are pressed against the side surfaces of the pressure rings 13 to enter into friction pressure contact, thereby to obtain the differential-limited state, as shown in FIG. 7B.

In the differential device 10, the both pressure rings 13 are biased by the biasing means 31 in a direction in which the pressure rings 13 come closer to each other, not through the clutch means 16, and thus the timing for switching from the differential state to the differential-limited state depends on the operation force F of the operation means 40 and the biasing force of the biasing means 31. Accordingly, setting the appropriate biasing force of the biasing means 31 makes it possible to reliably obtain the differential state during low-speed turning, and reliably obtain the differential-limited state during high-speed and high-load turning.

Meanwhile, when the rotational resistance in one wheel becomes smaller during backward running, even if a relative rotation torque is generated between the pinion shaft 14 and the differential case 20, the abutment surfaces 45 of the cam parts 41 are locked on the lock surfaces 42 of the cam grooves 43 to limit slight relative rotation of the pinion shaft 14 and the differential case 20 to maintain the smallest clearance 17, whereby the wheels are not brought into the differential-limited state. However, the differential device 10 may be configured such that switch takes place between the differential state and the differential-limited state during backward running, as during forward running. In this case, for example, the operation means 40 have cam parts formed in a rhomboid shape or a square shape, and cam grooves in an almost V shape adapted to the cam parts as described above.

In the spiral-type limited-slip differential mechanism 50, when there are small differences in rotation speed between the right and left, side gears 11 and the differential case 20, the inner pawl discs 18 and the outer pawl discs 19 are in pressure contact only by the biasing force of the disc springs 28, and thus the inner pawl discs 18 and the outer pawl discs 19 almost freely rotate relative to each other. Meanwhile, when there are large differences in rotation speed between the side gears 11 and the differential case 20, the inner pawl discs 18 move accordingly in the axial direction along the spiral-shaped gear-side fit parts 12, and the contact pressure between the inner pawl discs 18 and the outer pawl discs 19 becomes larger to distribute a larger rotation torque from the wheel side with a smaller rotational resistance to the wheel side with a larger rotational resistance, whereby the wheels are brought into the differential-limited state to limit the differential between the right and left wheels. Accordingly, even when the vehicle is started with one wheel completely lifted or the racing car bounds with one wheel rising up on the shoulder of a road in a circuit during cornering, the wheels can be brought into the differential-limited state to supply a sufficient rotation torque to the wheel on the road surface, whereby it is possible to significantly improve the driving stability of the vehicle during cornering.

As described above, in the differential device 10, basically as in conventional differential devices with a limited-slip differential mechanism, when the right and left wheels are the same in rotational resistance, the right and left wheels rotate at the same speed, whereas when the right and left wheels are different in rotational resistance, the wheels enter into the differential state in which the rotation speed of the wheel with a smaller rotational resistance is higher than the rotation speed of the wheel with a larger rotational resistance. In addition, the cam-type limited-slip differential mechanism 30 makes it possible to reliably obtain the differential-limited state during high-speed and high-load turning, and even when one wheel is lifted, the spiral-type limited-slip differential mechanism 50 makes it possible to reliably obtain the differential-limited state. Accordingly, the differential state and the differential-limited state can be switched at appropriate timing to improve the vehicle in driving stability. Even when the vehicle is started with one wheel completely lifted, the spiral-type limited-slip differential mechanism 50 makes it possible to start by transfering sufficient power to the other wheel on the ground. In addition, the spiral-type limited-slip differential mechanism 50 can be simply configured such that the gear-side fit parts 12 of the side gears 11 are formed in a spiral shape, thereby causing no increase in manufacturing costs for the differential device 10. The timing for switching between the cam-type limited-slip differential mechanism 30 and the spiral-type limited-slip differential mechanism 50 can be properly adjusted as required by adjusting the biasing force of the biasing means 31, the angle of the cam surfaces of the operation means 40, or the spiral angle θ1 of the gear-side fit parts 12 in the spiral-type limited-slip differential mechanism 50.

Next, another embodiment of the differential device 10 partially modified will be described. The same components of this embodiment as those in the foregoing embodiment are given the same reference numerals as those in the foregoing embodiment, and descriptions thereof are omitted.

Figure 8:
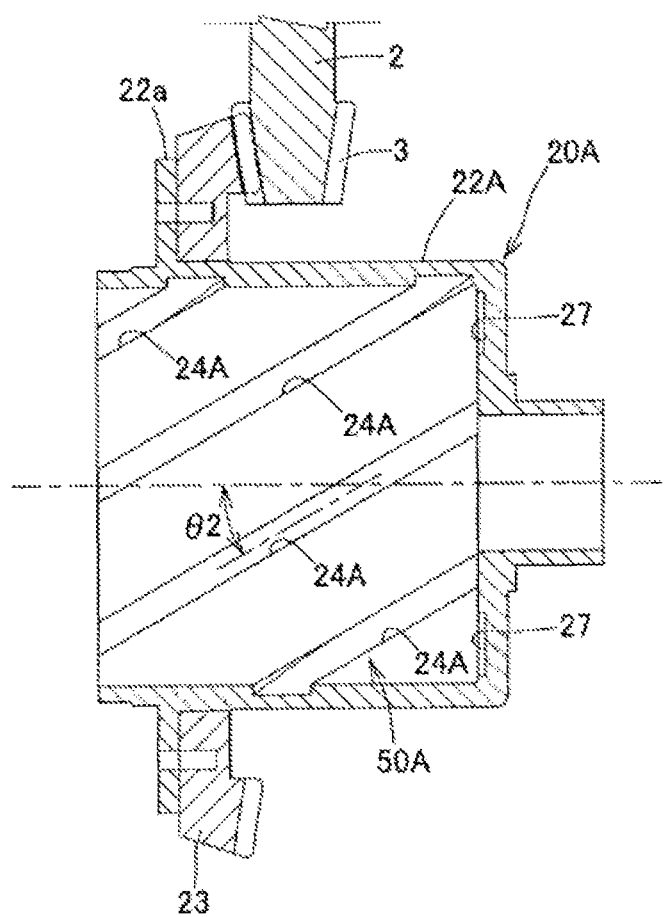
FIG. 8 is a transverse cross-section view of a differential case in a differential device in another configuration.
Figure 9:
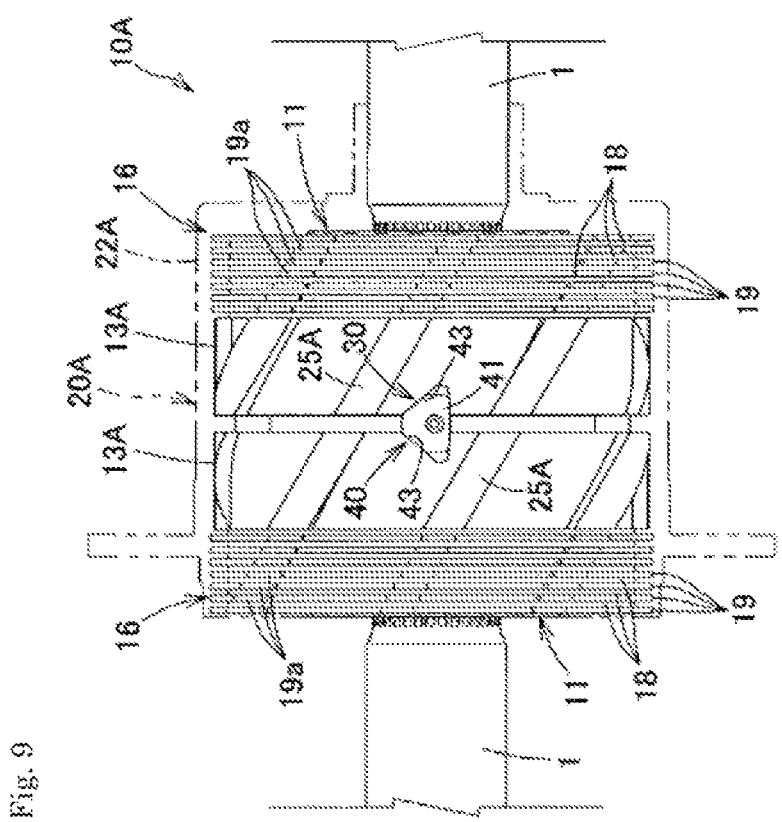
FIG. 9 is a plane view of discs and pressure plates in the differential device.

(1) As shown in FIGS. 8 and 9, a differential device 10A may be configured such that instead of the differential case 20 with the case-side fit parts 24, a differential case 20A is provided with case-side fit parts 24A as spiral-shaped streak grooves at circumferential intervals therebetween on an inner peripheral surface thereof, the case-side fit parts 24A having an angle θ2 with respect to the axial direction; instead of the pressure rings 13, pressure rings 13A are provided with spiral-shaped protruding streaks 25A fitted to the case-side fit parts 24A; the outer pawl parts 19a of the outer pawl discs 19 in the right and left clutch means 16 are fitted to the case-side fit parts 24A; the outer pawl discs 19 can move in the axial direction while rotating relative to the differential case 20A along the spiral-shaped case-side fit parts 24A of the differential case 20A; and a spiral-type limited-slip differential mechanism 50A is formed by the case-side fit parts 24A and the outer pawl discs 19 concave-convex fitted to the case-side fit parts 24A.

In the differential device 10A, the cam-type limited-slip differential mechanism 30 and the spiral-type limited-slip differential mechanism 50A switch between the differential state and the differential-limited state. In the spiral-type limited-slip differential mechanism 50A, when there are small differences in rotation speed between the differential case 20A and the side gears 11, the inner pawl discs 18 and the outer pawl discs 19 rotate relative to each other almost without friction resistance to obtain the differential state. Meanwhile, when there are large differences in rotation speed between the differential case 20A and the side gears U, the outer pawl discs 19 move accordingly in the axial direction along the spiral-shaped case-side fit parts 24A and is brought into pressure contact with the disc springs 28 or the pressure rings 13A. In addition the contact pressure between the inner pawl discs 18 and the outer pawl discs 19 becomes large to distribute a larger rotation torque to the side gear 11 with a lower rotation speed, whereby the wheels are brought into the differential-limited state to limit, the relative rotation of the side gears 11 and the differential case 20A.

The spiral angle θ2 of the case-side fit parts 24A with respect to the axial direction is set within the range of 20 to 60°, preferably 30 to 50°, more preferably 35 to 45°, as with the spiral angle θ1 of the gear-side fit parts 12 with respect to the axial direction.

The spiral-type limited-slip differential mechanism 50A may be used in combination with the spiral-type limited-slip differential mechanism 50 or singly not in combination with the spiral-type limited-slip differential mechanism 50. In the case of using a combination of the spiral-type limited slip differential mechanisms 50 and 50A, the spiral-shaped gear-side fit parts 12 and the spiral-shaped differential-side fit parts may be identical or reverse to each other in the direction of spiral. In addition, the spiral angle θ1 of the gear-side it parts 12 and the spiral angle θ2 of the differential-side fit parts may be identical or different from each other.

Figure 10:
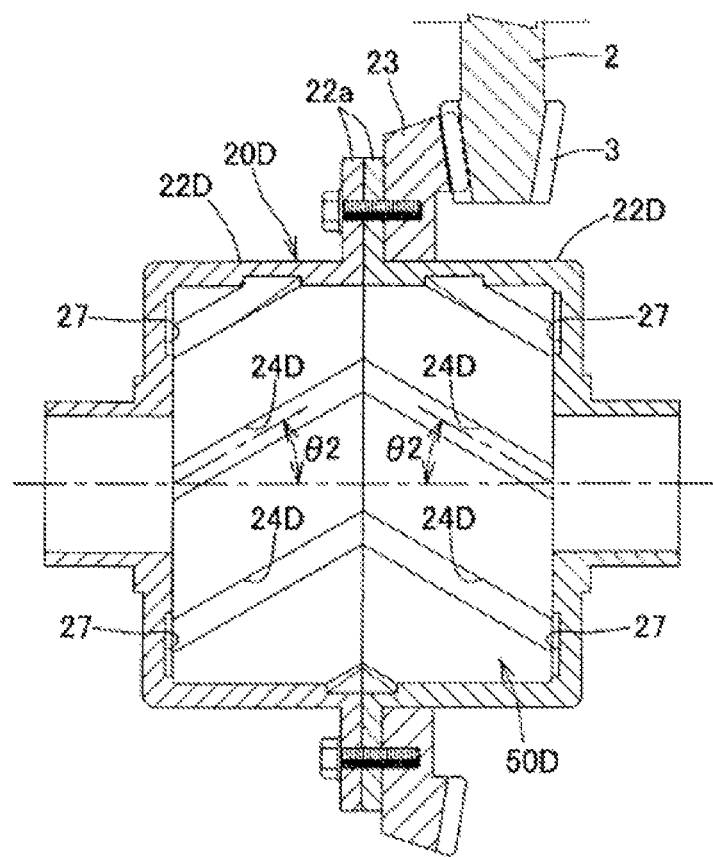
FIG. 10 is a transverse cross-section view of a differential case in a differential devise in another configuration.
Figure 11:
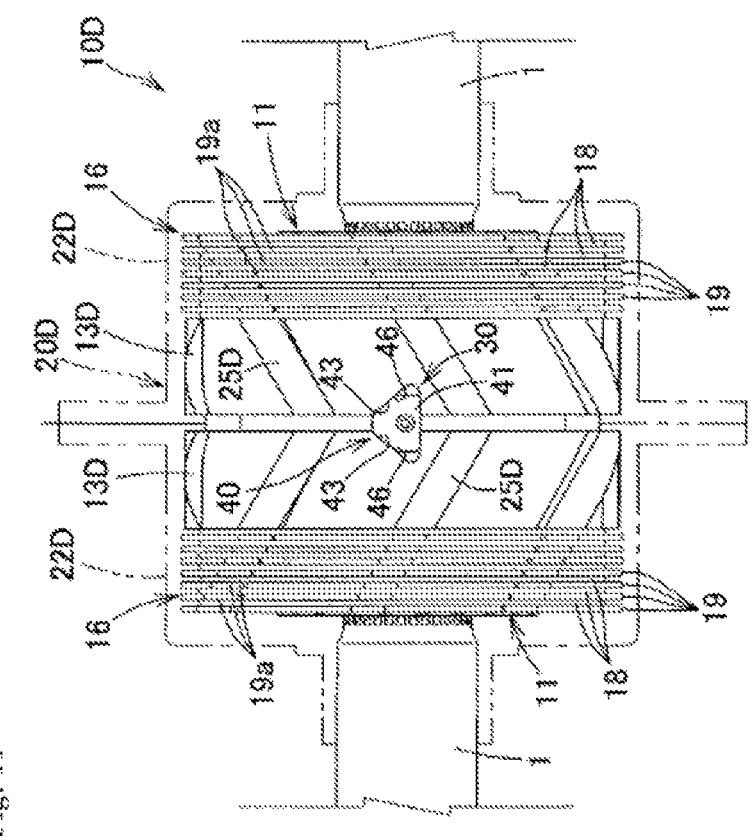
FIG. 11 is a plane view of discs and pressure plates in the differential device.

(2) As shown in FIGS. 10 and 11, a differential device 10D may be configured such that: instead of the differential case 20, a differential case 20D is provided with one pair of bilaterally symmetric case main bodies 22D divided at an almost intermediate portion of the axle direction; instead of the case-side lit parts 24, case-side fit parts 24D) as spiral-shaped streak grooves are formed at circumferential intervals therebetween on an inner peripheral surface of the left-side case main, body 22D), the case-side fit parts 24D having the angle θ2 with respect to the left-side axle 1; case-side fit parts 24D as spiral-shaped streak grooves are formed at circumferential intervals therebetween on an inner peripheral surface of the right-side case main both 22D, the case-side fit parts 24D having the angle θ2 with respect to the right-side axle 1; instead of the pressure rings 13, one pair of right and left pressure rings 13D is provided with spiral-shaped protruding streaks 25D fitted to the case-side fit parts 24D of the right and left case main bodies 22D; the outer pawl parts 19a of the outer pawl discs 19 in the right and left clutch means 16 are fitted to the case-side fit parts 24D of the right and left case main bodies 22D; the outer pawl discs 19 can move in the axial direction while rotating relative to the differential case 20D along the spiral-shaped case-side fit parts 24D of the differential case 20D; and the case-side fit parts 24D and the outer pawl discs 19 concave-convex fitted to the case-side fit parts 24D constitute a spiral-type limited-slip differential mechanism 50D.

The differential device 10D basically operates in the same manner as the differential device 10A. In the differential device 10D, the direction of inclination of spirals in the right and left case-side fit parts 24D and the direction of inclination of inclined cam surfaces 46 of the right and left pressure rings 13D are positioned almost orthogonal to each other. Accordingly, when the pressure rings 13D are operated outward in the axial direction by the inclined cam surfaces 46, the pressure rings 13D can be preferably moved in an easy manner in the axial direction while rotating along the case-side fit parts 24D.

Figure 12:
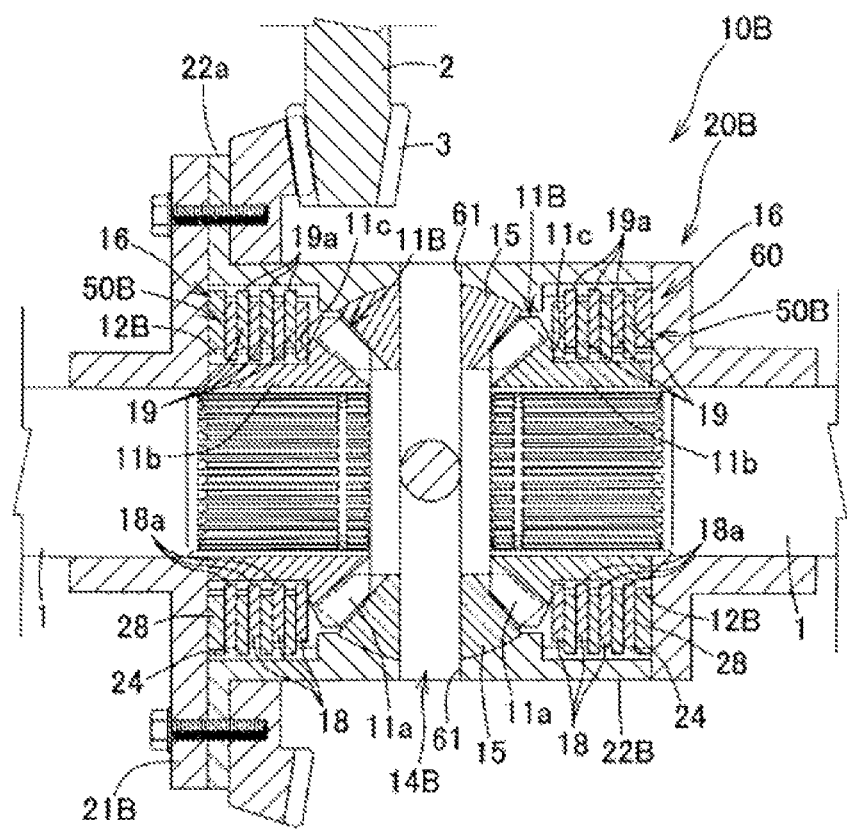
FIG. 12 is a transverse cross-section view of a differential device in another configuration.
Figure 13:
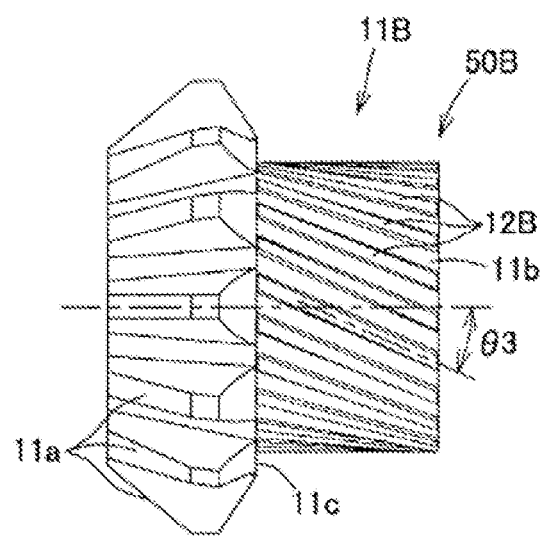
FIG. 13 is a side view of a side gear used in the differential device.

(3) As in a differential device 10B shown in FIGS. 12 and 13, the pressure rings 13, the biasing means 31, and the operation means 40 in the differential device 10 can be omitted. Specifically, the differential device 10B may be configured such that instead of the side gears 11, side gears 11B are provided with gear parts 11a and sleeve parts 11b smaller in diameter than the gear parts 11a; restriction surfaces 11c are formed at step portions between the gear parts 11a and the sleeve parts 11b to restrict movement of the discs 18 and 19; instead of the gear-side fit parts 12, gear-side fit parts 12B as spiral-shaped streak grooves are formed at circumferential intervals therebetween at outer peripheral portions of the sleeve parts 11b, the gear-side fit parts 12B having an angle θ3 with respect to the axial direction; the gear-side fit parts 12B and the inner pawl discs 18 concave-convex fitted to the gear-side fit parts 12B constitute a spiral-type limited-slip differential mechanism 50B; instead of the pinion shaft 14, a pinion shaft 14B is provided with the cam parts 41 omitted; instead of the differential case 20, a differential case 20B is provided with a cylindrical case main body 22B, a left-side lid member 21B, and a right-side lid member 60; and the pinion shaft 14B is fitted and fixed at axial ends to attachment holes 61 formed in a lengthwise intermediate portion, of the case main body 22B.

In the differential device 10B, when the right, and left wheels have the same rotational resistance, the side gears 11B, the pinion gears 15, the pinion shaft 14B, and the clutch means 16 rotate integrally with the differential case 20B, whereby the right and left wheels rotate at the same speed.

When the rotational resistance in one wheel becomes smaller during forward running, basically, the pinion gears 15 revolve while engaging with the gear parts 11a of the side gears 11B by part of rotational force acting on the differential case 20B, and thus the wheels are brought into the differential state in which the rotation speed of the wheel with a smaller rotational resistance is higher than the rotation speed of the wheel with a larger rotational resistance. When the differences in rotation speed between the right and left wheels becomes equal to or more than a specific value, the inner pawl discs 18 moves in the axial direction of the side gears 11B while, rotating relative to the side gears 11B by the concave-convex fit between the inner pawl discs 18 and the spiral-shaped gear-side fit parts 12, and the inner pawl discs 18 are received on the disc springs 28 or the restriction surfaces 11c, whereby the discs 18 and 19 are brought into pressure contact with each other. Then, the relative rotation of the differential case 20B and the side gears 11B is limited according to a friction force between the discs 18 and 19. Accordingly, it is possible to provide sufficient handling performance of the vehicle during high-speed and high-load running while improving turning performance of the vehicle during low-speed running, and it is also possible to allow the vehicle to be started with one wheel lifted, or provide the racing car with driving stability when the racing car hounds with one wheel rising up on the shoulder of a road in a circuit.

Figure 14:
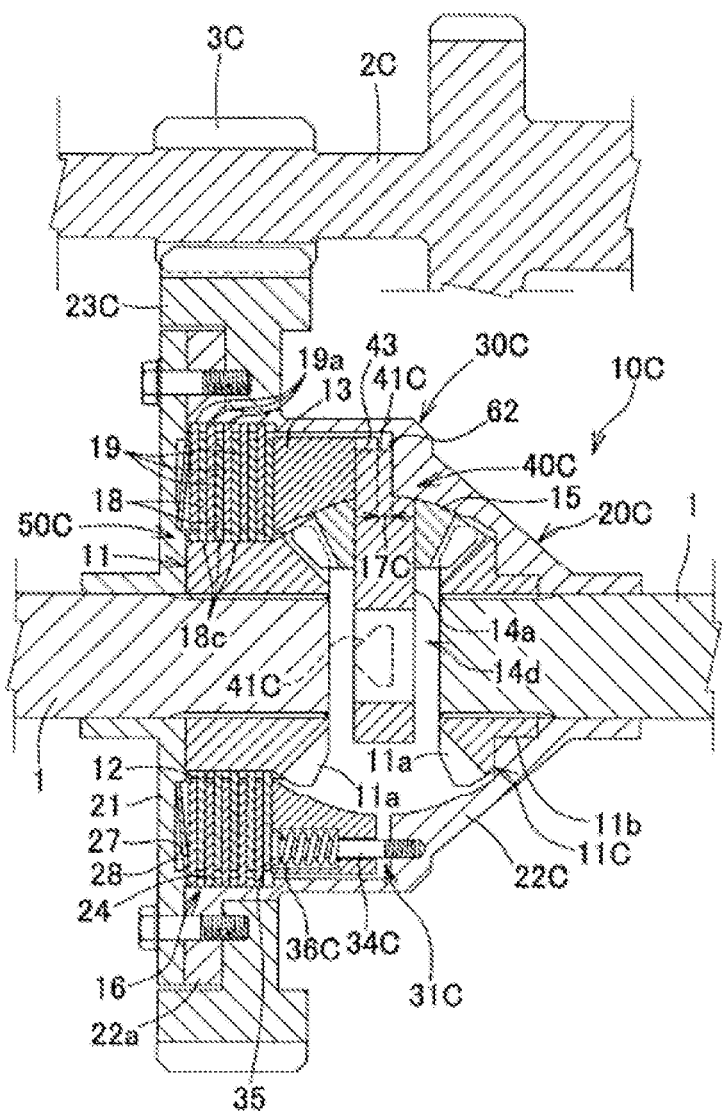
FIG. 14 is a transverse cross-section view of a differential device in another configuration.
Figure 15:
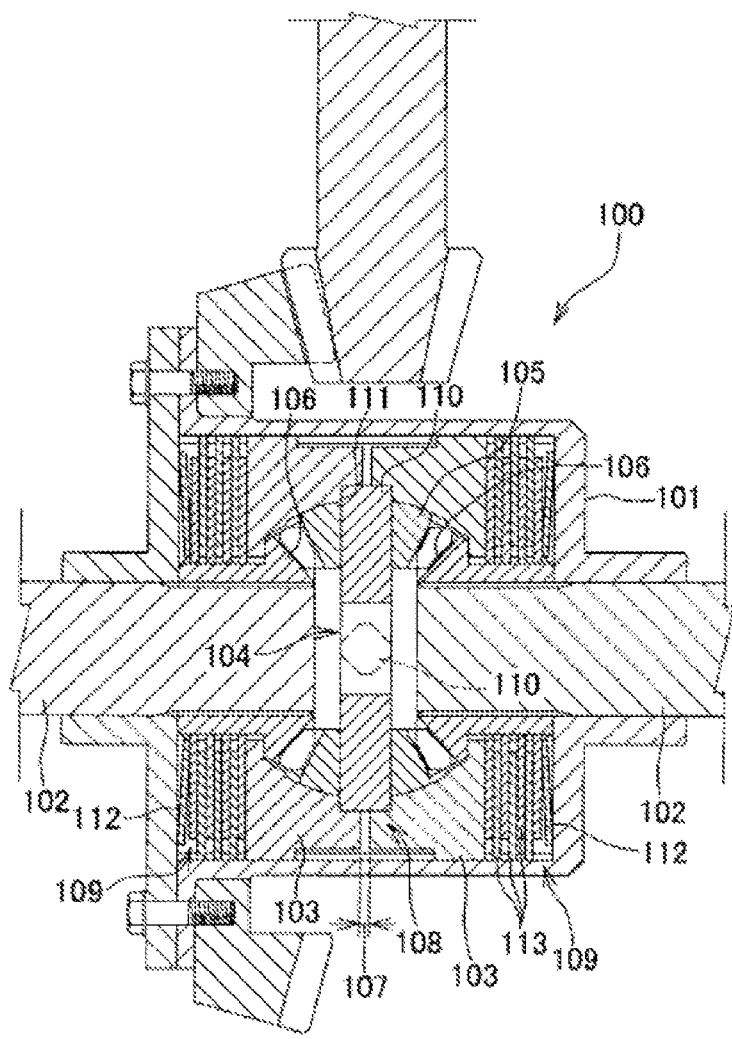
FIG. 15 is a transverse cross-section view of a differential device in a prior art.

(4) A differential device 10C shown in FIG. 14 is a differential device for FF vehicles that may be configured such that: the clutch means 16 is provided only between the left, side gear 11 and the differential case 20C to limit relative rotation of the side gear 11 and the differential case 20C; one pressure ring 13 is provided in the differential case 20C to cover an outer peripheral side of the left side gear 11, the pressure ring 13 can move along the axles and rotate together with the differential case 20C; instead, of the right side gear 11, a side gear 11C is provided with gear parts 11a and a sleeve part 11b smaller in diameter than the gear parts 11a; instead of the pinion shaft 14C, a pinion shaft 14C is provided so as to be held at a shaft end between the pressure ring 13 and a wall part of the differential case 20C opposed to the pressure ring 13; instead of the biasing means 31, a biasing means 31C is provided to bias the pressure ring 13 in a direction in which a clearance 17C between the pressure ring 13 and a ring opposed surface 62 of the differential case 20C is decreased: instead of the operation means 40, operation means 40C is provided on the shaft end of the pinion shaft 14C, and the pressure ring 13 and the ring opposed surface 62 of the differential case 20C holding the shaft end of the pinion shaft 14C to operate the pressure ring 13 against, the biasing force of the biasing means 31C in a direction in which the clearance 17C between the pressure ring 13 and the ring opposed surface 62 of the differential case 20C increases according to increase in relative rotation torque between the pinion shaft 14C and the differential case 20C in the differential state, thereby activating the clutch means 16.

The differential case 20C in the differential device 10C includes a case main body 22C reduced in diameter at a right portion. The right side gear 11C is rotatably assembled into the differential case 20C by fitting the sleeve part 11b rotatably to a right wall portion of the case main body 22C.

The case main body 22C has the flat annular ring opposed surface 62 orthogonal to the axles 1 at a portion opposed to the right side surface of the pressure ring 13. The pinion shaft 14C has, at the shaft ends thereof, cam parts 41C formed by cutting right half portions out of the cam parts 41 in the foregoing embodiment. The pinion shaft 14C is supported between the pressure ring 13 and the case main body 22A by sandwiching the cam part 41C between the cam grooves 43 formed in the pressure ring 13 and the ring opposed surface 62 of the case main boy 22A.

The operation means 40C includes the cam grooves 43 and the cam parts 41C. The operation means 40C basically functions in the same manner as the foregoing operation means 40. When there is a relative rotation torque between the pinion shaft 14C and the differential case 20C, the pressure ring 13 is operated in a direction away from the ring opposed surface 62, and the clearance 17C between the pressure ring 13 and the ring opposed surface 62 increases.

The biasing means 31C includes a rod member 34C and an elastic member 36C as a compression coil spring. The rod member 34C has a flange part 35 at a left end portion thereof, and a screw part at a right portion thereof. When the elastic member 36C is attached onto the rod member 34C, the rod member 34C is inserted into a through hole in the pressure ring 13 to tighten and fix the rod member 34C to the case main body 22A. The pressure ring 13 is constantly biased by the biasing means 31C toward the ring opposed surface 62, that is, in a direction in which the clearance 17C between the pressure ring 13 and the ring opposed surface decreases.

In the differential device 10C, the pressure ring 13, the operation means 40, and the biasing means constitute a cam-type limited-slip differential mechanism 30C, and the spiral-shaped gear-side fit parts 12 of the left side gear 11 and the inner pawl parts 18a of the inner pawl clutch 18 constitute a spiral-type limited-slip differential mechanism 50C.

In the differential device 10C, a rotation force from the engine is transferred to a ring gear 23C attached to the differential case 20C via a drive pinion 3C provided on a drive shaft 2C. When the right and left wheels have the same rotational resistance, the side gears 11 and 11C, the pinion gears 15, the pinion shaft 14C, and the clutch means 16 rotate integrally with the differential case 20C, whereby the right and left wheels rotate at the same speed.

When one wheel is smaller in rotational resistance during forward driving, the pinion gears 15 revolve while engaging with the gear parts 11a of the side gears 11 and 11C by part of the rotational force acting on the differential case 20C whereby the wheels are brought into the differential state in which the rotation speed of the wheel with a smaller rotational resistance is higher than the rotation speed of the wheel with a larger rotational resistance. During high-speed and high-load running, the earn type limited-slip differential mechanism 30C hunts the relative rotation of the side gears 11 and the differential case 20C by a friction pressure contact force between the discs 18 and 19 in the clutch means 16. This makes it possible to provide sufficient handling performance of the vehicle during high-speed and high-load running while improving turning performance of the vehicle during low-speed running. In addition, in the differential state, the rotation speed of the wheel with a smaller rotational resistance is higher than the rotation speed of the differential case 20C, and the rotation speed of the wheel with a larger rotational resistance is lower than the rotation speed of the differential case 20C, thereby to generate differences in rotation speed between the right and left side gears 11 and the differential case 20C and allow the inner pawl discs 18 and the outer pawl discs 19 to rotate relative to each other while being in sliding contact with each other in the clutch means 16. When the differences in rotation speed between the right and left wheels becomes equal to or more than a specific value, the spiral-type limited-slip differential mechanism 50C moves the inner pawl discs 18 in the axial direction, whereby the inner pawl discs 18 and the outer pawl discs 19 are brought into pressure contact to limit relative rotation of the right and left side gears 11 and the differential case 20C. This makes it possible to allow the vehicle to be started with one wheel lifted, or provide the racing car with driving stability when the racing car bounds with one wheel rising up on the shoulder of a road in a circuit.

In the differential device 10C, the spiral-type, limited-slip differential mechanism 50C is provided with the spiral-shaped gear-side fit parts 12 at the side gears 11. Alternatively, instead of or in addition to the spiral-type limited-slip differential mechanism 50C, the spiral-type limited-slip differential mechanism 50A may be provided with the spiral-shaped case-side fit parts 24, as in the differential device 10A.

As described above, the spiral-type limited-slip differential mechanism may be used singly or in combination with the cam-type limited-slip differential mechanism. In addition, the case-side fit, parts and the outer pawl discs may be reversed in concave-convex relationship at a concave-convex fit. Further, the gear side fit parts and the inner pawl discs may also be reversed in concave-convex relationship at a concave-convex fit.

As in the foregoing, embodiments of the present invention are described. However, the present invention is not limited to the foregoing embodiments. As a matter of the course, the embodiments of the present invention can be modified in configuration without departing from the gist of the present invention.

REFERENCE SIGNS LIST

1 Axle
2 Drive shaft
3 Drive pinion
10 Differential device
11 Side gear
11a Gear part
12 Gear-side fit part
13 Pressure ring
14 Pinion shaft
14a Shaft part
15 Pinion gear
16 Clutch means
17 Clearance
18 Inner pawl disc
18a Inner pawl
19 Outer pawl disc
19a Outer pawl
20 Differential case
21 Lid member
22 Case main body
23 Ring gear
24 Case-side fit part
25 Protruding streak
26 Gear chamber
27 Groove pit
28 Disc spring
30 Cam-type differential mechanism
31 Biasing means
33 Through hole
34 Rod member
35 Flange part
36 Elastic member
40 Operation means
41 Cam part
42 Lock surface
43 Cam groove
44 Operation surface
45 Abutment surface
46 Inclined cam surface
50 Spiral-type limited-slip differential device
P Relative rotation torque
θ Angle
θ1 Angle
10A Differential device
13A Pressure ring
20A Differential case
22A Case main body
24A Case-side fit part
25A Protruding streak
50A Spiral-type limited-slip differential mechanism
θ2 Angle
10B Differential device
11B Side gear
11a Gear part
11b Sleeve part
11c Restriction surface
12B Gear-side fit part
14B Pinion shaft
20B Differential case
21B Lid member
22B Case main body
50B Spiral-type limited-slip differential mechanism
60 Lid member
61 Attachment hole
θ3 Angle
10C Differential device
2C Drive shaft
3C Drive pinion
11C Side gear
14C Pinion shaft
17C Clearance
20C Differential case
22C Case main body
23C Ring gear
30C Cam-type limited-slip differential mechanism
31C Biasing Means
34C Rod member
36C Elastic member
40C Operation means
41C Cam part
50C Spiral-type limited-slip differential mechanism
62 Ring opposed surface
10D Differential device
20D Differential case
22D Case main body
24D Case-side fit part
25D Protruding streak
50D Spiral-type limited-slip differential mechanism

The invention claimed is:

1. A differential device with a limited-slip differential mechanism, comprising: a differential case that rotates around right and left axles by a driving force from an engine; a pair of right and left side gears that are provided in the differential case at ends of the right and left axles so as to be incapable of relative rotation; a pinion shaft that is provided orthogonal to the axles between the pair of right and left side gears and rotates together with the differential case; and at least a pair of pinion gears that are provided rotatably at the pinion shaft and engage with the pair of right and left side gears, wherein a clutch means is provided between at least one of the side gears and the differential case to limit relative rotation of the side gear and the differential case, the clutch means includes one or more inner pawl discs and outer pawl discs that are alternately arranged in the axial direction of the side gear between an inner peripheral surface of the differential case and an outer peripheral surface of the side gear, the side gears include a gear-side fit part extending in the axial direction to which the inner pawl disc is concave-convex fitted, the differential case includes a case-side fit part extending in the axial direction to which the outer pawl disc is concave-convex fitted, and at least one of the gear-side fit part and the case-side fit part is formed in a spiral shape angled with respect to the axial direction, and wherein a spiral angle with respect to the axial direction is set within the range of 20 to 60°.

2. The differential device with a limited-slip differential mechanism according to claim 1, wherein the clutch means is provided between the right side gear and the differential case and between the left side gear and the differential case to limit relative rotation of the side gears and the differential case.

3. The differential device with a limited-slip differential mechanism according to claim 2, wherein the gear-side fit part is formed in a spiral shape, and the gear-side fit parts in the pair of side gears are set so as to be reversed to each other in the direction of spiral in the assembled state.

4. The differential device with a limited-slip differential mechanism according to claim 3, wherein the gear-side fit parts in the pair of side gears are made different from each other in the spiral angle with respect to the axial direction.

5. The differential device with a limited-slip differential mechanism according to claim 4, wherein a pair of right and left pressure rings movable along the axles and rotating together with the differential case is provided in the differential case so as to cover outer peripheral sides of the right and left side gears, biasing means is provided to bias the both pressure rings in a direction in which a clearance between the both pressure rings decreases, the pinion shaft is provided so as to be held at shaft ends thereof between the right and left pressure rings, and operation means is provided between the shaft ends of the pinion shaft and the right and left pressure rings to operate the pressure rings against the biasing force of the biasing means in a direction in which the clearance between the both pressure rings increases according to increase in relative rotation torque between the pinion shaft and the differential case in the differential state, thereby activating the clutch means.

6. The differential device with a limited-slip differential mechanism according to claim 1, wherein the clutch means is provided only between one side gear and the differential case to limit relative rotation of the side gear and the differential case, one pressure ring movable along the axles and rotating together with the differential case is provided in the differential case so as to cover an outer peripheral side of the one side gear, the pinion shaft is provided so as to be held at a shaft end thereof between the pressure ring and a wall portion of the differential case opposed to the pressure ring, and operation means is provided between the shaft end of the pinion shaft and the pressure ring and the wall portion of the differential case holding the shaft end to operate the pressure ring against the biasing force of the biasing means in a direction in which the clearance between the pressure ring and the differential case increases according to increase in relative rotation torque between the pinion shaft and the differential case in the differential state, thereby activating the clutch means.

7. The differential device with a limited-slip differential mechanism according to claim 5 or 6, wherein biasing means is provided to bias the pressure ring in a direction in which the clearance decreases not through the clutch means.

\* \* \* \* \*